Jan. 12, 1971  R. A. DALY  3,554,726
GLASS FEEDING APPARATUS WITH ORIFICE PLATE SUPPORT
FRAME AND LIFTING MEANS THEREFOR
Filed July 11, 1968  2 Sheets-Sheet 1

INVENTOR.
ROBERT A. DALY
BY
McCormick, Paulding & Huber
ATTORNEYS

United States Patent Office 3,554,726
Patented Jan. 12, 1971

3,554,726
GLASS FEEDING APPARATUS WITH ORIFICE PLATE SUPPORT FRAME AND LIFTING MEANS THEREFOR
Robert A. Daly, West Hartford, Conn., assignor to Emhart Corporation, Bloomfield, Conn., a corporation of Connecticut
Filed July 11, 1968, Ser. No. 744,090
Int. Cl. C03b 5/26, 7/00
U.S. Cl. 65—325                           5 Claims

ABSTRACT OF THE DISCLOSURE

An orifice plate having three orifices through which molten glass gobs can be fed is mounted in a pan, which pan is mounted in a standardized support ring capable of accommodating orifice plates and pans of various configurations. The support ring is loosely received on a pivoted frame movable to and from a raised position wherein a depending lug on the outlet spout casing of a conventional molten glass feeder bowl is received in an opening in the support ring to accurately locate the orifice plate and support ring in the outlet spout. The frame is raised by an air cylinder pivotally mounted to the outlet spout casing, and a toggle clamp releasably secures the frame in its raised position.

SUMMARY OF THE INVENTION

This invention relates to molten glass feeding apparatus, and deals more particularly with a support frame which can be raised by novel means to raise a plural charge orifice plate into position adjacent the outlet spout of a molten glass feeder bowl.

A general object of the present invention is to provide a pivoted frame for a plural charge orifice plate, which frame will accommodate plates of various sizes and configurations.

Another object of the present invention is to provide a pivoted frame of the foregoing character, which frame is hydraulically operated so as to be especially useful in raising the relatively heavy orifice plates and their associated holders, or pans, into position adjacent the outlet spout of molten glass feeder bowl.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

DETAILED DESCRIPTION

Figure 1:
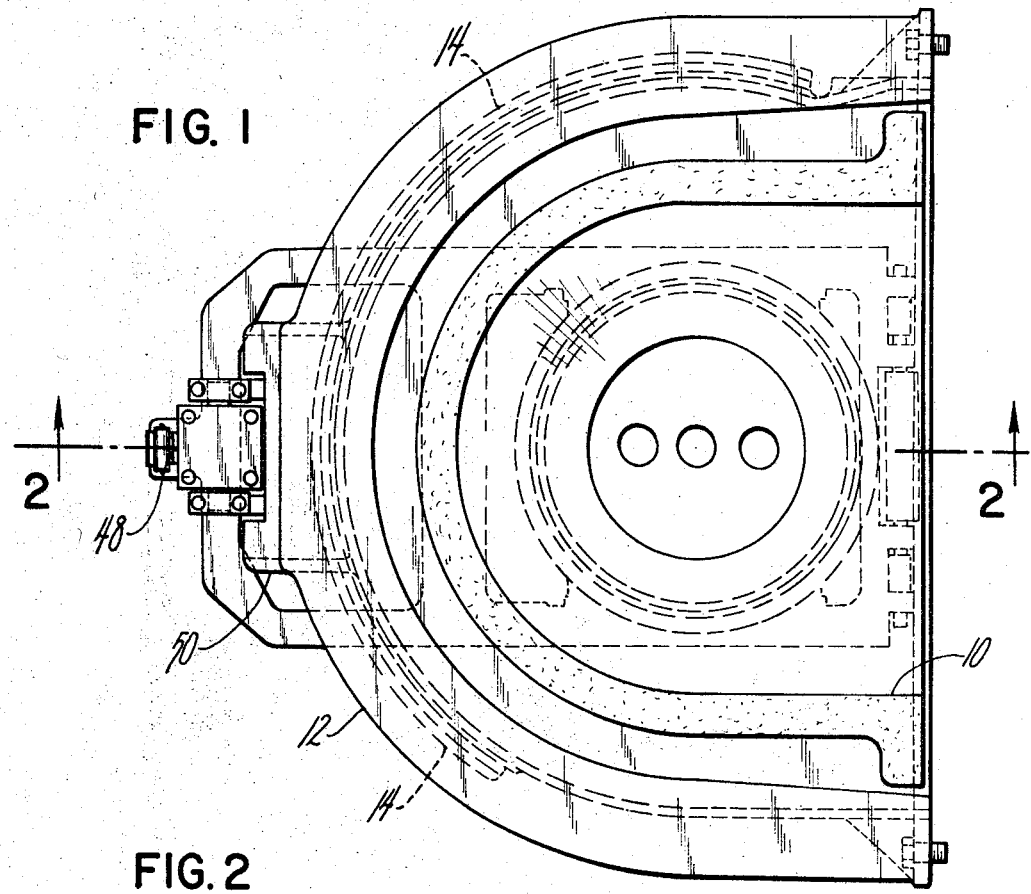
FIG. 1 is a plan view of a molten glass feeder bowl showing an outlet spout in the lower wall thereof, and showing a generally flat wall of the type adapted for attaching the feeder bowl to the downstream end of a forehearth.
Figure 2:
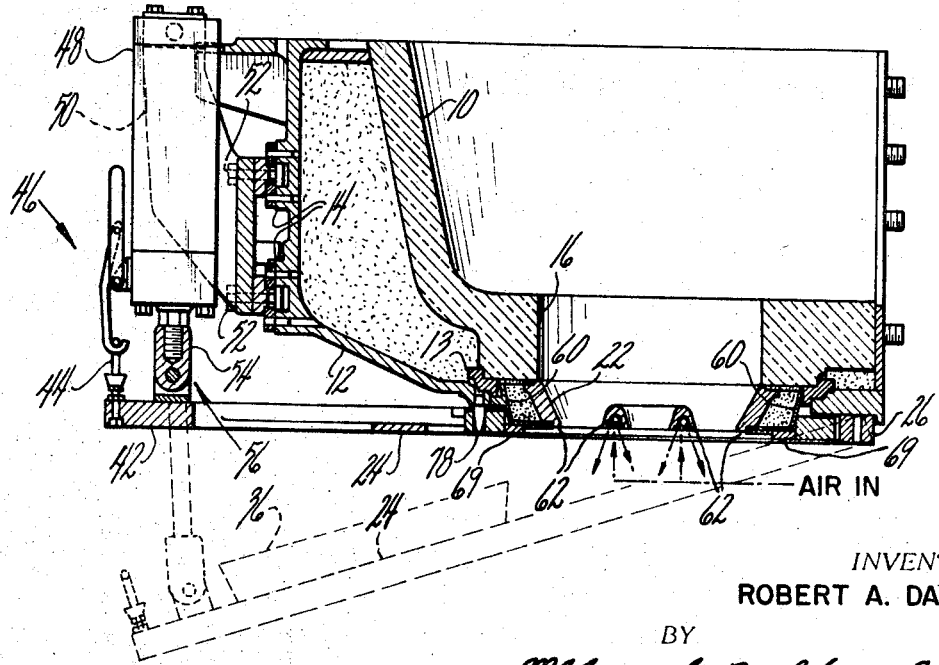
FIG. 2 is a vertical sectional view of the feeder bowl and outlet spout casing shown in FIG. 1, being taken along the line 2—2 of that view, and also showing the hydraulically operated support frame in which the orifice plate is mounted, the frame being shown in the raised position in full lines with the orifice plate in the outlet spout of the casing, and the frame being shown in broken lines in its lowered position.

Turning now to the drawings in greater detail, FIGS. 1 and 2 show a ceramic feeder bowl 10 of conventional construction mounted in an outlet spout casing 12 of the type which is provided with peripherally extending gibs 14, 14. An annular adapter 13 supports the bowl in the casing 12, and the space between the bowl and casing is preferably packed with insulation in a conventional manner. The feeder bowl and its associated casing would normally be provided with a suitable molten glass feeder mechanism (not shown) including reciprocating plungers and the like for periodically forcing charges of molten glass downwardly through orifices defined in a plate which is located in the outlet spout 16. For example, two such reciprocating plungers might be adapted for use in feeding molten glass charges through the three orifices 18, 18 and 20 in the orifice plate 22 best shown in FIG. 4. The orifice plate 22 defines three orifices 18, 20 and 18 located on a line defined by the respective centers of these orifice openings, and each opening has associated therewith a well or depression defined by a pair of dams or low walls located between these openings. More particularly, these plungers might be operated in the manner suggested by Peiler in Pat. No. 2,654,184, or in the manner suggested by Barker in Pat. No. 2,340,729. While the disclosures in these patents relate to a double orifice plate through which molten glass is forced by a single plunger, it will be apparent that two such plungers might be adapted for feeding molten glass through the triple orifice plate 22 disclosed herein. If desired, three such plungers might be used for forcing the molten glass through these three orifices.

Figure 3:
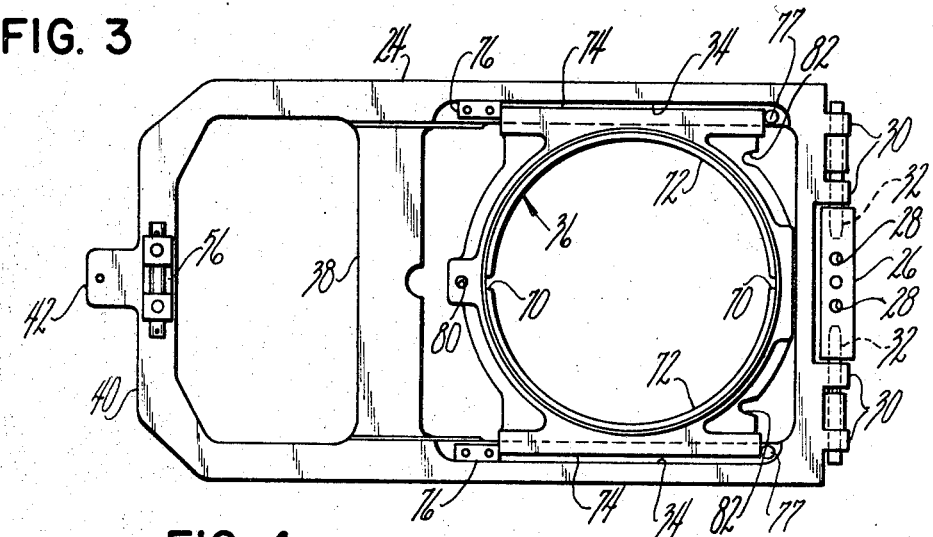
FIG. 3 is a horizontal plan view of the pivotally mounted frame shown in FIG. 2, with the orifice plate and pan removed in order to show a support ring therefor.

In accordance with the present invention, an orifice plate support frame 24 is hingedly supported from the underside of the outlet spout casing 12 adjacent the spout portion for movement between the solid and broken line positions shown in FIG. 2. FIG. 3 shows details of the hinge construction, wherein a hinge block 26 is provided with openings 28, 28 for use in attaching the hinge block to the underside of the outlet spout casing. The support frame 24 is provided with rearwardly extending lugs 30, 30 through which a pair of hinge pins 32, 32 can be passed so as to enter openings in the hinge block 26 provided for this purpose.

The support frame 24 has forwardly extending parallel leg portions which define ways 34, 34 for receiving an orifice plate support ring 36 to be described in greater detail hereinbelow. The legs of the frame 24 are strengthened by a cross member 38 intermediate the hinged and free end portions thereof, and a second cross member 40 provided at the free end of the pivoted frame 24 includes a forwardly extending portion 42 for receiving an eye bolt 44 which comprises a striker for the toggle clamp indicated generally at 46 in FIG. 2.

In further accordance with the present invention, lifting means is provided for raising and lowering the free end of the frame 24 to permit ready removal and replacement of the orifice plate 22. As shown in FIG. 2, said lifting means comprises a fluid motor having a first, or upper part 48, pivotally mounted to a fixed bracket 50, which bracket 50 is mounted to the peripherally extending gibs 14, 14 by screws 52, 52. More particularly, the first motor part 48 comprises the normally fixed portion of an air cylinder having an internal piston (not shown) adapted for reciprocating movement in response to the delivery and exhausting of air under pressure to its lower side. A second part of the fluid motor, in this instance the actuating rod to which the piston is connected, extends downwardly through an opening provided for this purpose in the cylinder part 48 and is pivotally connected to the free end of the frame 24 by a clevis connection indicated generally at 56. As so constructed and arranged, the frame 24 can be raised from the broken to the solid line positions shown in FIG. 2 as a result of suitable valving in an air line provided to the air cylinder 48. Preferably, the overcenter latch 46 provided on the first motor part 48 serves as a convenient means for locking the frame 24 in its raised position.

Figure 4:
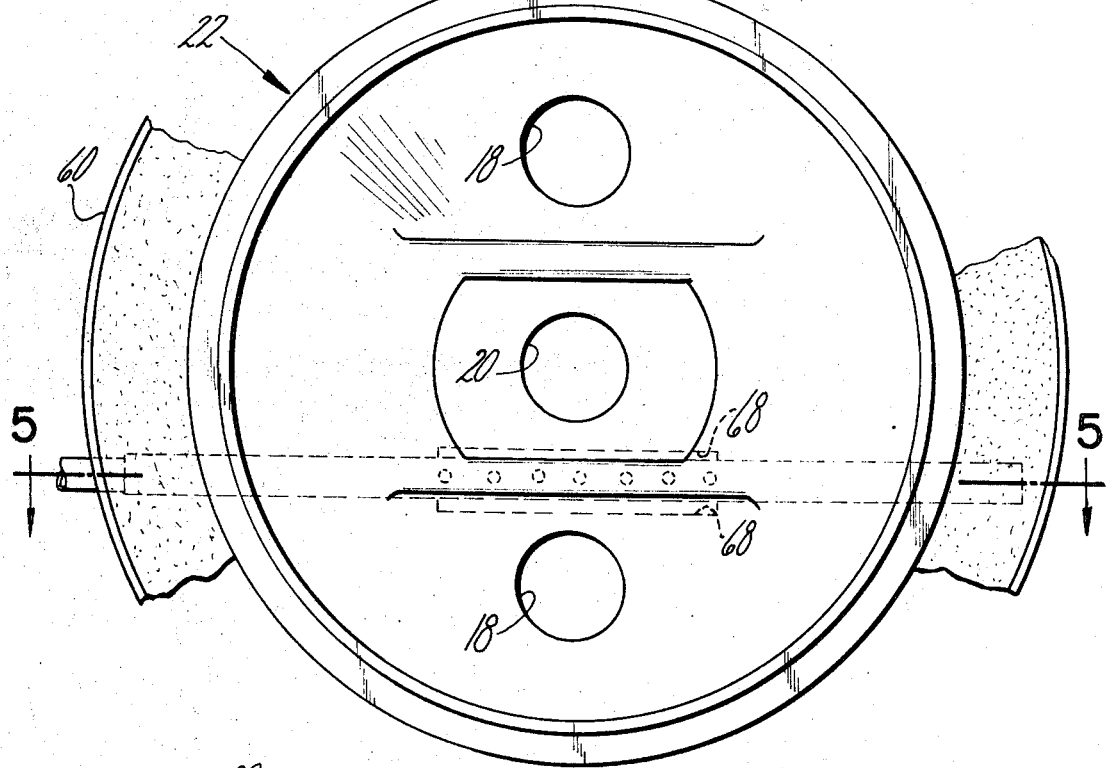
FIG. 4 is a horizontal plan view of the orifice plate shown in FIG. 1.
Figure 5:
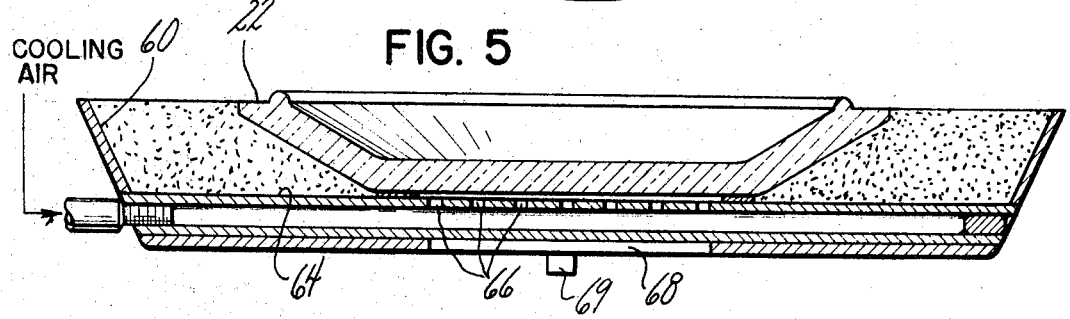
FIG. 5 is a sectional view taken along the line 5—5 of FIG. 4 showing the manner in which the orifice plate is internally cooled as outlined schematically in FIG. 2.

Turning now to a more complete description of the means for mounting the orifice plate 22 in the hinged frame 24, FIGS. 2 and 4 show the plate mounted in a holder pan or shell 60 which is circular in shape and somewhat larger in diameter than the orifice plate 22, and which defines openings for receiving depending bosses 62, 62 for receiving these openings in the holder pan 60. The holder pan or shell 60 can be seen from FIG. 5 to include an upwardly extending peripheral wall encircling the circumferential edge of the circular orifice plate 22, and as shown in FIG. 5, a longitudinally extending tubular member 64 is provided between the orifice plate openings 18, 18 and 20 so as to provide cooling air to the well defining portion of the orifice plate. The cooling air is exhausted upwardly through these openings 66, 66 against the underside of the orifice plate well, and thence downwardly through slots 68, 68 in a manner described in greater detail in Pat. No. 2,340,729, issued to Barker. The space between the orifice plate 22 and the holder pan or shell 60 is packed with a suitable insulating material, such as Sill-O-Cell. Finally, and still with reference to the pin or shell 60, this component of the present invention is preferably made of steel, and locating tabs, or lugs 69, 69 are provided in diametrically opposed relationship on the underside of the pan so as to be received in corresponding slots 70, 70 in the orifice plate support ring 36. Thus, the orifice plate 22 can be seen to be accurately positioned in the support ring 36, and it is an important feature of the present invention that the hinged frame 24 includes means for properly locating the ring 36 in position adjacent the outlet spout as the air cylinder 48 moves the frame into its raised position.

The support ring 36 is of generally annular shape, having two inwardly extending arcuate ledges 72, 72 for receiving the circular pan 60, the aforementioned slots 70, 70 being defined by the adjacent end portions of these ledges 72, 72. The support ring 36 also includes radially outwardly extending portions 74, 74 which support the ring on the ways 34, 34 of the frame 24. Thus, the ring 36 is slidably, or loosely received, on the frame 24 and fixed stops 76, 76 are provided as shown for locating the ring 36 in approximately the desired relationship to the outlet spout of the casing 12. Two pins 77, 77 stop the ring from movement in the opposite direction. As best shown in broken lines in FIG. 2, the support ring 36, and its associated orifice plate and holder pan, can all be moved upwardly or downwardly along the elongated frame 24 to facilitate removal or replacement of these components. The support ring 36 need only be lifted slightly by the workman to clear the stops 76, 76 on the frame 24 and the ring can be conveniently slid downwardly away from the outlet spout to the position indicated in broken lines in FIG. 2, wherein the ring can be more conveniently handled.

Means is provided for accurately locating the orifice support ring 36, and consequently the orifice plate 22, in position adjacent the outlet spout 16 as the fluid motor 48 raises the frame 24 into its raised position. Preferably, said means for so locating the support ring 36 comprises at least one and preferably three depending lugs, one of which is shown at 78 in FIG. 2, all of which lugs are received in openings provided for this purpose in the support ring, as for example, the opening 80 shown in FIG. 3. The slots 82, 82 provided in the ring 36 also receive depending lugs or pins (not shown) provided in the outlet spout casing, it will be apparent that these slots 82, 82 receive their associated lugs or pins during the raising of the frame 24 at a time prior to that when the pin 78 is received in the opening 80. Thus, the support ring 36 may be urged forwardly slightly as the frame is being raised, but the stops 76, 76 assure that the ring is not moved excessively as the frame 24 is so raised. The pin 78 serves to accurately locate the support ring 36, and hence the orifice plate 22 in the outlet spout during the last portion of its travel. As so constructed and arranged, there is provided a standardized frame capable of being permanently assembled with a standardized outlet spout casing and feeder bowl. Any one of a plurality of orifice plates and holder pans can be conveniently mounted on a support ring with a minimum of downtime to the feeder apparatus. Further, the ring itself is easily removable from the frame, facilitating mating of the ring with particular orifice plate and holder pan at a location remote from the spout opening.

What is claimed is:

1. In a glass feeding apparatus for forming molten glass gobs at the outlet spout of a feeder bowl, the improvement comprising an orifice plate having a plurality of openings through which the glass is fed, a frame for supporting said orifice plate, means pivotally supporting one end of said frame from the underside of the feeder bowl adjacent the outlet spout, and a fluid motor having a first motor part mounted to the feeder bowl and a second part movable with respect to said first part and connected to the opposite end of said frame for raising and lowering the frame to permit removal and replacement of the plate.

2. The combination defined in claim 1 and further characterized by an orifice plate holder pan with an upwardly extending peripheral wall encircling the peripheral edge of said orifice plate, said plate having a plurality of wells at the bottom of each of which wells one of said openings is defined, and said holder pan having a bottom wall with openings for receiving said wells in said plate.

3. The combination defined in claim 2 and further characterized by an orifice plate support ring having slots to receive locating tabs on said holder pan, said support ring being slidably carried on said pivotally mounted frame and having locating means which cooperate with means on the feeder bowl to seat the orifice plate in position adjacent the outlet spout as said fluid motor moves said frame into its raised position.

4. The combination defined in claim 3 wherein said feeder bowl has an outlet spout casing, a bracket mounted to said casing for pivotally supporting said first motor part, said means on said feeder bowl for locating said support ring comprising at least one depending lug in said outlet spout casing, which lug is receivable in a corresponding opening in said ring when said frame is so raised, and stop means on said frame for loosely receiving said ring on said frame so that as said frame is being raised said lug accurately locates said plate in position adjacent the outlet spout.

5. The combination defined in claim 4 and further characterized by toggle clamp means mounted to said first fluid motor part, and means on said frame for engagement by said clamp means for releasably securing said frame in its raised position.

References Cited

UNITED STATES PATENTS

| 1,519,885 | 12/1924 | Tucker et al. | 65—126X |
| 3,393,989 | 7/1968 | Strausbaugh | 65—325 |

S. LEON BASHORE, Primary Examiner

S. R. FRIEDMAN, Assistant Examiner

U.S. Cl. X.R.

65—126, 128, 327